United States Patent [19]

Matiere

[11] Patent Number: 4,685,829

[45] Date of Patent: Aug. 11, 1987

[54] MODULAR CONSTRUCTION SYSTEM FOR A COVERED STRUCTURE

[76] Inventor: Marcel Matiere, 17, avenue Aristide Briand, Aurillac 15000, France

[21] Appl. No.: 887,107

[22] PCT Filed: Nov. 4, 1985

[86] PCT No.: PCT/FR85/00310

§ 371 Date: Jul. 2, 1986

§ 102(e) Date: Jul. 2, 1986

[87] PCT Pub. No.: WO86/02967

PCT Pub. Date: May 22, 1986

[30] Foreign Application Priority Data

Nov. 5, 1984 [FR] France ............................... 84 16810

[51] Int. Cl.[4] .............................................. E01F 5/00
[52] U.S. Cl. ........................................ 405/124; 52/88;
138/105; 405/149
[58] Field of Search ............... 405/124, 125, 126, 149;
138/111, 114, 115, 116, 117; 52/86–89

[56] References Cited

U.S. PATENT DOCUMENTS

| | | | |
|---|---|---|---|
| 997,382 | 7/1911 | Foster | 405/125 |
| 1,120,104 | 12/1914 | Thomas | 52/87 |
| 1,746,566 | 2/1930 | Tufts | 138/105 X |
| 3,858,614 | 1/1975 | Moore et al. | 138/105 |
| 4,314,775 | 2/1982 | Johnson | 405/154 |
| 4,595,314 | 6/1986 | Lockwood | 405/124 X |

FOREIGN PATENT DOCUMENTS

| | | |
|---|---|---|
| 547476 | 5/1956 | Belgium . |
| 2623179 | 12/1977 | Fed. Rep. of Germany . |
| 935451 | 2/1948 | France ............................... 405/126 |
| 2223513 | 10/1974 | France . |
| 2358518 | 2/1978 | France . |
| 788048 | 12/1957 | United Kingdom ........................ 52/88 |

Primary Examiner—Dennis L. Taylor
Attorney, Agent, or Firm—Frost & Jacobs

[57] ABSTRACT

The invention relates to a modular construction system for a covered structure of large section produced by assembling prefabricated elements, namely floor elements (1), side elements (2) placed on each side of the floor, and roof elements (4).

The structure according to the invention is composed of at least two juxtaposed passage sections (S, S') having parallel axes (0, 0'), each bounded at the bottom by a floor element (1, 1') and at the top by a roof element (4, 4') and, at the sides, on the outside by a side element (2, 2') and on the inside by at least one intermediate pier (6) supported on the ground by means of a sole piece (7) interposed between the adjacent longitudinal sides (11, 11') of the two floor elements (1, 1') which frame it, said pier (6) being provided at the top with a longitudinal member (5) comprising two side walls (52) diverging in V-shape to form on each side of a median plane P1 two support surfaces (53) in the form of concave grooves on which rest the adjacent longitudinal sides (41) of the two roof elements (4, 4') framing the intermediate pier (6).

8 Claims, 4 Drawing Figures

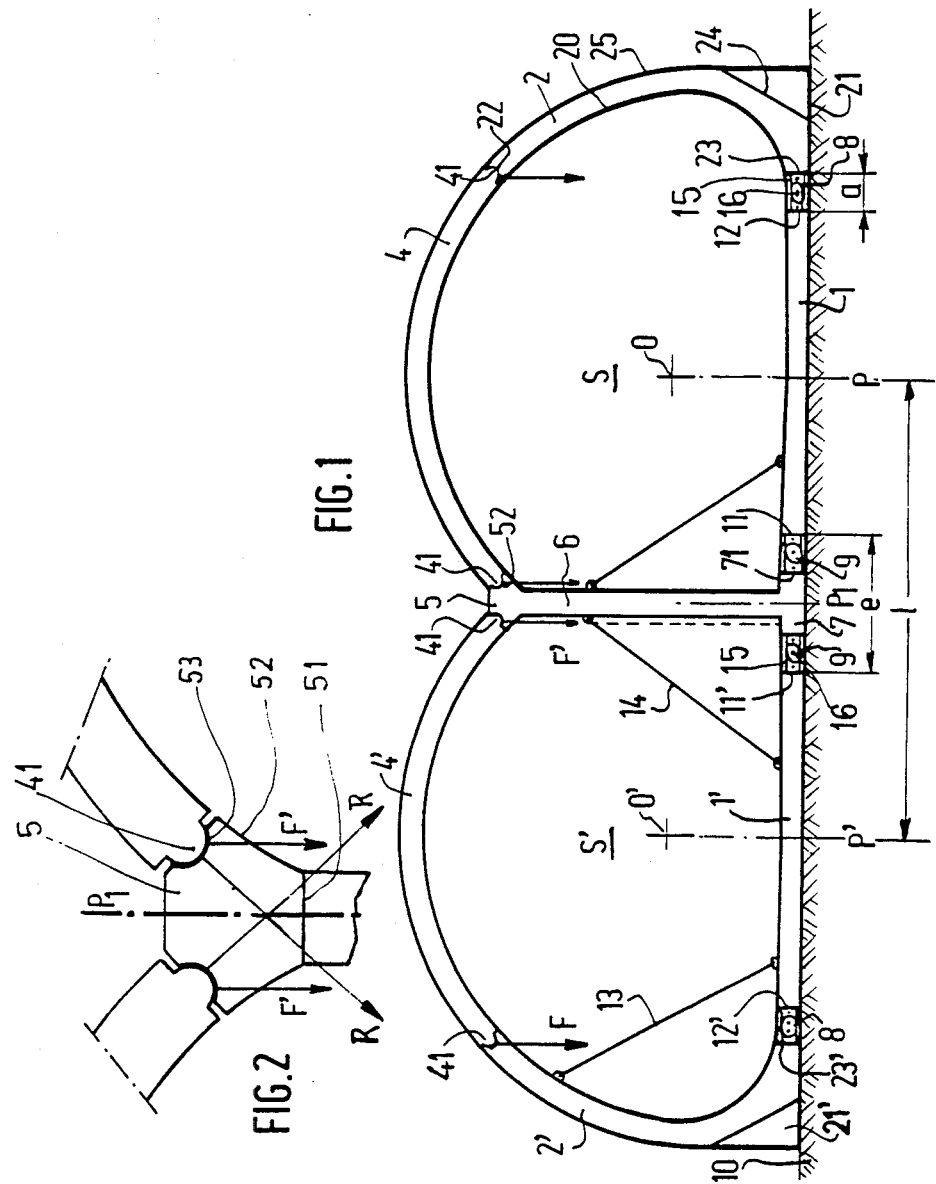

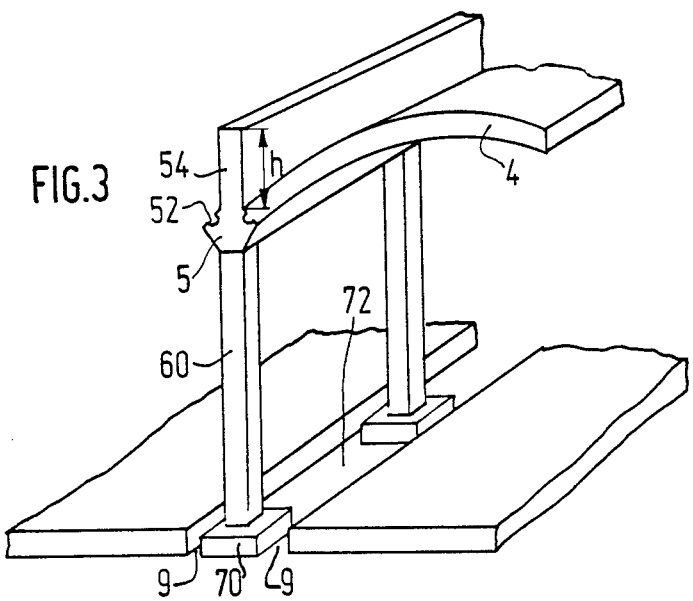
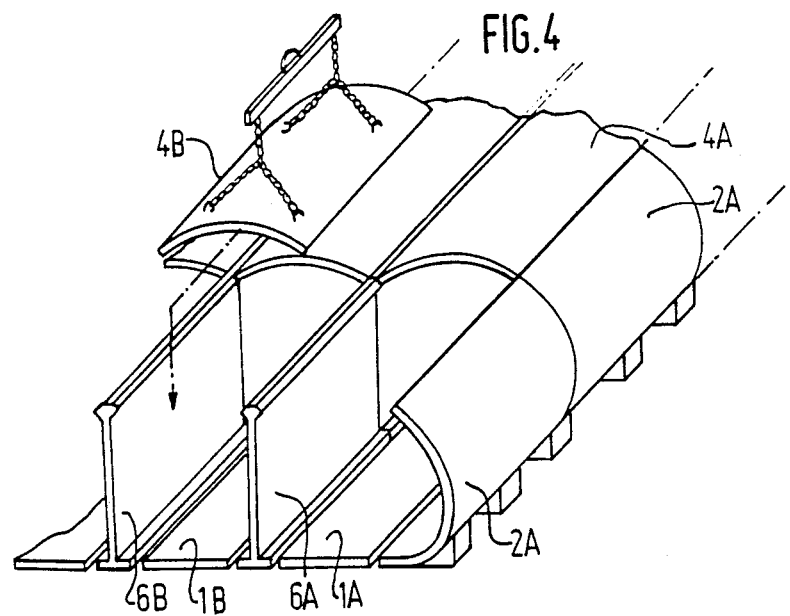

MODULAR CONSTRUCTION SYSTEM FOR A COVERED STRUCTURE

The present invention relates to a modular construction system for a covered structure of large section, and to a process for constructing the same, and applies in particular to the construction of underground conduits or of buildings.

In the Applicants' European patent application No. 00 81 402 a process has already been described for the construction of a covered structure in the form of a conduit of large section produced by assembling prefabricated longitudinal elements, each of which forms only a part of the cross-section and which are connected together by optionally articulated longitudinal connections. This process, as described therein, is applicable to conduits or underground passages whose cross-section, which is preferably flattened at the base with a width-to-height ratio of about 1.5, may be as great as 35 square meters or even more. It will be realized that it is difficult to give such conduits a width of the order of two or three times their height, for example, because it would then be necessary for the elements of the structure to be reinforced in a prohibitive manner.

However, passages of great width are sometimes required, for example for multilane road underpasses, where a great height is not necessary and is even inadvisable because of the uselessly entailed volume of earthwork, or where such a height is even inacceptable, for example because of the need to confine the works to a prescribed maximum height.

Furthermore, in certain cases it may be advantageous to increase the ground level area of the volume constructed and consequently for a given section, to increase its width by reducing its height in comparison with a conduit of conventional section.

The present invention seeks to solve these problems by making improvements and extensions to the technique of constructing conduits of large section which is described in the above-mentioned European patent application.

In a general way, a large-section conduit of this kind is produced by assembling prefabricated elements, namely flat elements forming a floor, side elements disposed on each side of the floor, and roof elements of curvilinear profile resting, preferably with interposed articulated supports, on the top ends of the side elements, the latter including a curved wall whose inner profile joins at the top that of the roof elements and, at the bottom, the horizontal floor. In addition, the side elements rest on the ground with interposed external stabilizers, which give them sufficient support to enable them to stand upright without additional supports, scaffolding, or the like.

The present invention covers a modular construction system for a covered structure composed of at least two sections lying side by side and having parallel axes, each bounded at the top by a floor element, at the bottom by a roof element, and, at the sides, on the outside by a side element and on the inside by at least one intermediate pier supported on the ground by means of a sole piece interposed between the floor elements framing it; said pier supports an intermediate longitudinal girder comprising two side walls diverging in V-shape so as to form two support surfaces in the form of concave grooves on which rest the adjacent longitudinal sides of the two corresponding roof elements.

In a first embodiment each intermediate pier is composed of a vertical wall, in which openings are optionally formed and which is provided at its base with a continuous sole piece, while its top part forms the intermediate longitudinal support girder for the roof elements.

In another embodiment each intermediate pier is composed of a series of pillars provided at their base with individual support sole pieces, which are laid between the adjacent longitudinal edges of the floor elements, the gaps between the floors and between the sole pieces being concreted after laying, in order to join the whole arrangement together. The intermediate longitudinal member may advantageously be extended, above the supports, by a shouldering beam of sufficient height to enable it to withstand the bending forces occurring during use, taking into account the spacing of the pillars.

The invention also covers the process for the construction of a structure of this kind, which comprises the following stages:

The ground having been previously prepared to form a resistant bedding surface at the desired level, a number of floor elements corresponding to the number of sections to be constructed are first placed on the ground, optionally cemented in place, and aligned on the axes of said sections. The piers are then placed between the floor elements and the incurved side elements are placed along the outer sides, leaving a space between the opposite longitudinal edges. Like the side elements, the piers must be sufficiently firmly seated to stand upright by themselves. If the piers are composed of spaced pillars, longitudinal beams are then placed on their tops to form the intermediate longitudinal girders and joined to the pillars. If the piers are composed of vertical walls, their tops will themselves form the longitudinal girder.

It is then possible to place the roof elements in position one after the other, resting them by their longitudinal edges, on the outside, on the side elements and, on the inside, on the support surfaces provided along the intermediate longitudinal girders.

Concrete is finally poured to fill the spaces left between the floor elements, the side elements, and the sole pieces of the piers, so as to join the whole arrangement together.

The conduit is formed in this way, advancing portion by portion.

According to advantageous procedures: the different elements of the conduit may be joined with pretensioning;

at least some of the connections between longitudinal elements are placed in stress nodes, that is to say zones where the absolute value of the stresses passes through a minimum;

at least some longitudinal connections between two adjacent elements constitute in each case an articulation permitting a limited angular displacement;

these articulated connections are situated in zones where the absolute value of the stresses passes through a minimum.

The invention will now be described in greater detail with the aid of practical examples, which are given without constituting limitations and are illustrated in the drawings, in which:

FIG. 1 is a cross-section of a structure produced in accordance with the invention;

FIG. 2 is a detail view of the supports on the intermediate longitudinal girder.

FIG. 3 is a detail view in perspective of another embodiment;

FIG. 4 is a diagram in perspective showing the construction of a multi-section structure.

The structure shown in the drawings is intended, for example, to hold a two-lane motor carriageway. It is composed of prefabricated reinforced concrete elements. As in the case of the previously mentioned European Patent No. 0080.402, these elements comprise, in cross-section, floor elements 1, side elements 2, and roof elements 4.

For the construction of a structure of this type, forming a single-section conduit, the floor elements are first placed on the ground 10 previously prepared at the desired level, and may optionally be cemented in place. Floor elements may also be placed in advance over a certain length and aligned along the axis of the conduit being built. According to a particularly advantageous characteristic of the invention the same prefabricated elements may be used for the construction of structures comprising a plurality of juxtaposed sections in accordance with a modular system.

FIG. 1 shows by way of example a structure comprising two juxtaposed sections whose axes 0, 0' are spaced a distance 1 apart which is so selected that between the roof elements 4, 4' a sufficient space is left to receive an intermediate longitudinal support girder 5.

For the construction of a structure of this type, therefore, two parallel series 1 and 1' of floor elements will be placed in position, leaving between their adjacent longitudinal edges 11 and 11' a distance (e) depending on the distance between centers (1).

Between the adjacent longitudinal edges 11 and 11' of the floor elements 1 and 1' is placed a vertical support element 6 forming a pier, which at its base is provided with a support sole piece 7 and is surmounted by a longitudinal girder 5. The latter is bounded by two side walls 52 diverging in V-shape, in such a manner as to provide at its upper part, two support surface 53 of identical shape, at the top longitudinal edges 22 that the side elements 2. These support surfaces 53 will therefore preferably be in the form of concave circular grooves, on which rest the rounded longitudinal edges 41 of the roof elements 4, in such a manner as to form a support articulated about a longitudinal direction.

The width of the support sole piece 7 is determined in dependence on the distance (e) between the inner longitudinal edges 11, 11' of the roof elements 1, 1', in such a manner that between the latter and the edges 71 of the sole piece a space 9 is left which provides a certain adjustability of the position of the pier 6.

On each side of the outer edges 12 and 12' of the floor elements are then placed the incurved side elements 2 and 2'. In accordance with an arrangement already described in the previous patent, these elements are composed of an incurved wall whose inner profile 20 has a variable curvature enabling it to be connected at the bottom to the top horizontal portion of the floor 1, and at the top to the circular profile of the roof element.

The position of the inner longitudinal edges 23 of the side elements 2 is determined in such a manner that, taking into account their seating area and the distribution of loads, said elements will stand upright by themselves, without scaffolding, even when they support at their top ends 22 the dead weight of the roof elements 4 while leaving, between the inner longitudinal edges 23, 23' and outer longitudinal edges 12, 12' respectively of the side elements 2, 2' and floor elements 1, 1' a space 8 of sufficient width (a) to allow accurate adjustment of the position of the side element 2, 2' on installation.

After the elements have been installed, the adjustment spaces 8 and 9 are cemented up to effect the locking-in of the floor, loops of connecting iron bars being left for this purpose on the sides of the elements. Longitudinal reinforcements 16 are threaded through these loops 15 so as to achieve continuity of the locking action and to homogenize deformation between successive sections of the conduit.

In accordance with an arrangement described in the previous patent, the side elements 2, 2' are provided at their base, on the outer side, with stabilizers 21 of triangular section, which may extend over the entire length of the side element or, as can be seen in FIG. 4, may consist of regularly spaced prismatic elements.

The bottom part 24 of the outer face 25 of the incurved wall is advantageously plane and inclined, for example with a ratio of 3:1 in relation to the base, in such a manner as to facilitate the compacting of the backfilling on the outer sides.

The elements are so designed that when they are under load, under the backfilling, the stresses which occur are transmitted in substantially tangential directions from the roof element 4 to the side element 2, while the support reactions then pass substantially at the centre of the articulation. On the other hand, when the roof element 4 is installed and is loaded solely by its own weight, it will exert on the ends of the side elements 2, vertical forces F which will be applied to horizontal tangent plane parts of the grooves 22.

The support grooves 53 provided on each side of the longitudinal beams 5 are of entirely identical construction to the support grooves 22 of the side elements 2, and the width of the longitudinal member is made so that the support loads F' will not be far from the median plane P1 of the pier 6. The width of the sole piece 7 can be so determined as to enable the pier 6 to stand upright by itself, without scaffolding, while leaving an adjustment space 8 at its sides.

It will in fact be observed that, taking into account the dimensions required for withstanding the loads due to the backfilling, the roof elements 4 are relatively rigid and are not liable to be deformed under their own weight; consequently, on installation, the loads applied to the supports 5 have practically no horizontal component. Thus, after a pier 6 has been installed between the floors 1 and 1' and side elements 2 and 2' of the latter, it will be possible for one roof element 4 and then the other 4' to be placed in position in succession, there being no risk that the pier 6 will be overturned when it is loaded on one side only, particularly as friction between the edges of the roof element and the support grooves also contributes towards the stability of the intermediate piers. Obviously, when the two roof elements 4 and 4' are in place, the whole arrangement is perfectly stable, the longitudinal member 5 being equally loaded on both sides. The entire floor can then be joined together and locked in place by cementing up the spaces 8 and 9 left between the longitudinal edges of the floor and, respectively, the side elements 2 and the sole piece 7 of the pier 6.

If the side elements and the piers 6 are so designed as to stand up in the vertical position by themselves, it is obviously preferable for these elements to be supported during installation by removable props 13 and 14 disposed between the floor and, respectively, the side elements 2, 2' and the pier 6. There is in fact always some risk of incorrect handling, for example the swaying of the roof element while it is being placed in position, which would accidentally subject the support elements to horizontal forces capable of overturning them. However, this system of props can be light and can be removed as soon as the roof elements 4 and 4' have been placed in position on each side of the central pier.

FIG. 1 shows a structure comprising two juxtaposed sections, but the same system of modular construction could be extended to multisection structures as shown in FIG. 4, for example for the purpose of constructing a conduit having a very large section or a multilane road passage.

In the example shown in FIG. 4, the central pier is a solid vertical wall, in which doors may optionally be formed. However, in certain cases it may be desirable to construct it in the form of spaced pillars, as shown in FIG. 3, or even in the form of oblique beams. In view of the advantages achieved through the construction of the conduit in accordance with the invention, particularly the fact that it can be built quickly and with a very small team (for example 4 persons), the invention is in fact not limited solely to the construction of sunken passages or conduits, but may also be of advantage for other applications, for example the construction of industrial buildings or dwellings. In this case the building will be composed of parallel aisles and it is more advantageous to make the piers in the form of spaced pillars to allow communication between aisles, as shown in the partial view in FIG. 3.

If the strength of the ground allows, it is advantageous to limit the number of pillars by increasing their span. To ensure that the intermediate longitudinal member 5 will retain sufficient flexural strength between supports, it is expedient to increase its height by extending it in the upward direction, above the supports 52, by means of a shouldering beam 54 whose height is determined in dependence on the loads supported and the reinforcement which it is possible to place there. However, this additional height h will preferably not be greater than the sag of the roof element 4, in order not to go beyond the top level of the latter.

When the floor is sealed in, not only the joints 9 between the sole pieces 70 of the pillars 60, but also the spaces 72 left between the pillars, will be cemented. In a general way, moereover, the seating surface and the reinforcement of the sole pieces 70 and of their junction to the floor will be designed in accordance with the loads supported by the pillars 60 and with the strength of the ground.

All the prefabricated elements constituting the conduit will normally be of concrete, but in accordance with an arrangement already provided for in European Patent No. 0081 402 it is possible for certain elements to be made differently, particularly the roof elements. Thus, in the case of the construction of industrial buildings, it could be of interest to construct the roof elements in the form of panels of metal or plastic material, optionally corrugated, while they could also be provided with lighting openings.

The invention is obviously not limited to the details of the embodiments, which have been described only by way of example, while other variants could be conceived without departing from the scope of protection defined by the claims.

I claim:

1. Modular construction system for a covered structure of large cross-section produced by assembling prefabricated elements, each of which forms only a part of the perimeter and which comprise respectively plane elements (1) forming a floor laid on the ground, side elements (2) placed on each side of the floor, and roof elements (4) of curvilinear profile resting, with interposed articulated supports (41), on the top ends of the side elements (2), the latter including an incurved wall whose inner profile joins at the top that of the roof element (4) and, at the bottom, the top face of the floor (1), said incurved wall resting on the ground with interposed external stabilizers (21), which give them sufficient support to enable them to stand upright without additional support, the floor elements (1) being fastened at least to the base of the side elements (2) by sealing-in after installation, this structure being characterized by the fact that it is composed of at least two sections (S, S') lying side by side and having parallel axes (0, 0'), each bounded at the bottom by a floor element (1, 1'), at the top by a roof element (4, 4'), and, at the sides, on the outside by a side element (2, 2') and on the inside by at least one intermediate pier (6) supported on the ground by means of a sole piece (7) interposed between the adjacent longitudinal sides (11, 11') of the two floor elements (1, 1') framing it, said pier (6) being provided at the top with a longitudinal member (5) comprising two side walls (52) diverging in V-shape so as to form two support surfaces (53), one on each side of a median plane $P_1$, which are in the form of concave grooves on which rest the adjacent longitudinal sides (41) of the two roof elements (4, 4') framing said intermediate pier (6).

2. Structure according to claim 1, characterized in that each intermediate pier (6) is composed of a vertical wall, in which openings are optionally formed and which is provided at its base with a continuous supporting sole piece (7), while its top part forms the intermediate longitudinal girder (5) supporting the roof elements (4, 4').

3. Structure according to claim 1, characterized in that each intermediate pier (6) is composed of a series of pillars (60), each provided at its base with an individual sole piece (70) and supporting a longitudinal beam (5) forming the longitudinal girder the gaps (72, 9) between the floors (1, 1') and between the sole pieces (70) being concreted after laying in order to effect the sealing-in of the floor.

4. Structure according to claim 3, characterized in that the longitudinal beam (5) constituting the longitudinal member is extended above the supports (53) by a shouldering beam (54) of sufficient height to enable it to withstand the bending forces occurring during use, taking into account the spacing of the pillars (60).

5. Structure as in any one of the preceding claims, characterized in that the profile of the pier (6) is so designed that said pier will be stable even when it is located on one side only during the installation of roof elements (4).

6. Structure as in any one of claims 1-4, characterized in that the floor elements (1), the bases of the side elements (2), and the sole pieces (7) of the intermediate piers (6) are provided on their longitudinal sides with connection bars in loop form which intercross in the spaces (8, 9) left between the sides of said elements and into which are threaded longitudinal reinforcements (16), the whole arrangement being concreted to effect continuous sealing-in and the homogenization of deformations between the successive portions of the structure.

7. Process for the construction of a covered structure of large section, produced by assembling prefabricated elements and comprising, in accordance with claim 1, at least two juxtaposed sections (S, S′) having parallel axes (0, 0′) and separated by an intermediate pier (6), characterized by the fact that the construction is effected on ground previously prepared at the desired level, in accordance with the following stages:

floor elements (1, 1′) are placed on the ground, optionally cemented in place, and aligned on the axes (0, 0′) of the sections which are to be built;

the incurved side elements (2, 2′) are placed along the respective outer longitudinal edges (12, 12′), and the intermediate piers (6) are placed between the adjacent longitudinal edges (11, 11′) of the floor elements (1, 1′), said side elements (2, 2′) and piers (6) being sufficiently firmly seated to stand upright by themselves and the piers (6) being provided at the top with longitudinal support members (5);

the longitudinal roof members are placed in position one after the other, resting them by their longitudinal edges, on the outside, on the side elements (2, 2′) and, on the inside, on the support surfaces (53) of the longitudinal members (5);

concrete is poured to fill the gaps between the floor elements (1, 1′), the bases of the side elements (2, 2′) and the sole pieces (7) of the piers (6), in such a manner as to join them together.

8. Process according to claim 7 for the construction of a covered structure in which the piers (6) are composed of spaced pillars (60), characterized by the fact that after the pillars (60) have been placed in position between the floor elements (1, 1′), longitudinal beams (5) are laid on their top part to form the longitudinal support girders which are then fastened to the pillars (60).

* * * * *